United States Patent [19]

Green

[11] 3,851,849

[45] Dec. 3, 1974

[54] CLAMP ASSEMBLY

[75] Inventor: Raymond J. Green, Northville, Mich.

[73] Assignee: General Motors Corporation, Detroit, Mich.

[22] Filed: May 21, 1973

[21] Appl. No.: 361,874

[52] U.S. Cl. ............... 248/503, 403/186, 403/230, 403/405, 24/81 AA, 24/81 CC, 248/507
[51] Int. Cl. .............................................. B25b 5/08
[58] Field of Search .......... 403/262, 186, 263, 230, 403/338, 405; 269/91, 93, 94; 248/361 B, 361 R, 25

[56] References Cited
UNITED STATES PATENTS

| | | |
|---|---|---|
| 1,801,222 | 4/1931 | Cayo .................................... 269/93 |
| 2,126,307 | 8/1938 | Boedeker ......................... 248/361 B |
| 2,965,886 | 12/1960 | Mitchell ............................. 403/230 |
| 3,787,024 | 1/1974 | Dzus, Jr. .......................... 248/361 B |

Primary Examiner—Andrew V. Kundrat
Attorney, Agent, or Firm—R. L. Phillips

[57] ABSTRACT

A clamp assembly having a single fastener acting on one clamp member and acting through this clamp member on another clamp member so that the respective clamp members clamp two different components having different clamping force requirements with appropriate clamping forces.

5 Claims, 5 Drawing Figures 3,851,849

CLAMP ASSEMBLY

This invention relates to a clamp assembly for clamping two different components having different clamping force requirements and more particularly to such an assembly wherein a single fastener cooperates with a pair of clamp members to effect the different required clamping forces.

On apparatus having different components with different clamping requirements, it is common practice to select a separate clamp member and fastener to meet each particular requirement. Where such a pair of components are arranged close to each other, I have found that it is possible to meet the different clamping force requirements with a pair of clamp members and a single fastener thus eliminating one of the fasteners and also the accommodating space necessary for such fastener which can be very important where space is at a premium. For example, the available component attaching locations on passenger car engines continues to decrease with the increase in components, particularly emission control apparatus and thus any savings in space around the engine is highly desirable. Such a situation exists in a certain rotary engine assembly where the engine's distributor and oil separator are arranged close to each other and have different clamping requirements to effect their proper securing to the engine and there is not sufficient space for separate conventional clamping arrangements. The clamp assembly according to the present invention is readily suitable to meeting such a situation with a first clamp member that has a leg resting on a single clamp mounting pad formed on the engine between the distributor and oil separator and arms which engage the oil separator in a direction to press the oil separator against its mounting pad on the engine. A second clamp member has a foot which engages the first clamp member and arms which engage the distributor in a direction to press the distributor against its mounting pad on the engine. A single fastener in the form of a bolt extends through apertures in the legs of the two clamp members and is threaded to the clamp mounting pad on the engine. The bolt is torqued to apply force to the second clamp member at a location intermediate its foot and the distributor so that the second clamp member clamps the distributor to its mounting pad with the required high clamping force while the foot acts on the first clamp member to clamp the oil separator to its mounting pad with the required low clamping force with the difference in these clamping forces being adjustable and decreasing as the distance between the foot and the fastener is increased.

An object of the present invention is to provide a new and improved clamp assembly for clamping two different components requiring different clamping forces.

Another object is to provide a clamp assembly having two clamp members and a single fastener that cooperate to clamp two different components with different clamping forces.

Another object is to provide a clamp assembly having a single fastener acting on a first clamp member to clamp a component with a certain clamping force and with the first clamp member also acting on a second clamp member to clamp another component with a lower clamping force.

These and other objects of the present invention will become more apparent with reference to the following description and drawing in which.

Figure 1:
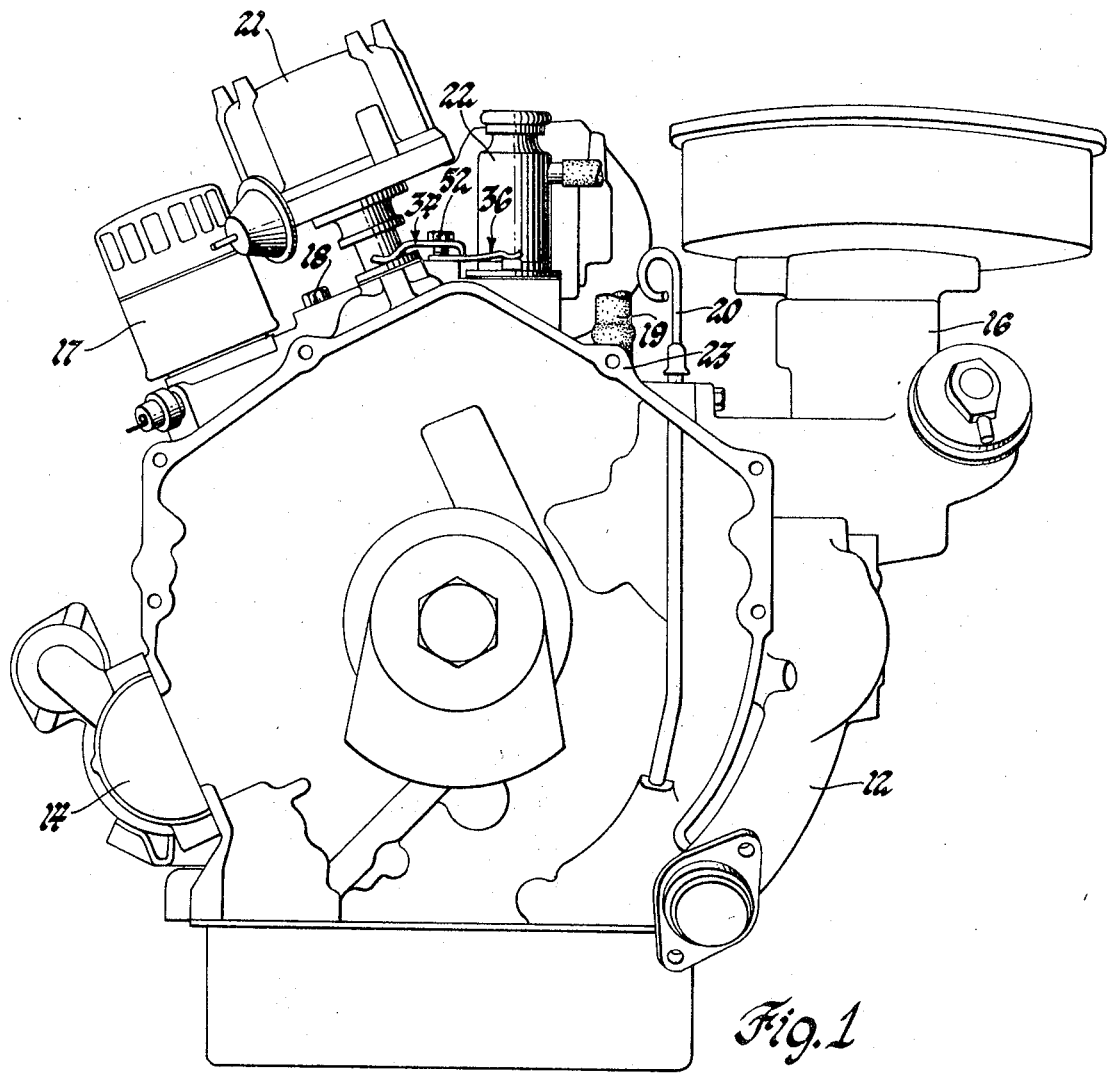
FIG. 1 is a rear elevational view of a rotary engine having a distributor and oil separator clamped thereto with a clamp assembly according to the present invention.

Referring to FIG. 1, there is shown a preferred embodiment of the clamp assembly according to the present invention adapted to clamp certain components to a rotary combustion engine. The engine is surrounded by components including an exhaust manifold 12 and starter 14 which are located on opposite sides of the engine; an intake manifold 16 that is located above the exhaust manifold 12; an oil filter 17, a plug 18, an attached hose 19 and an oil dip stick 20 that are all located on top the engine; and a distributor 21 and an oil separator 22 which are both located on top of the engine intermediate the plug 18 and hose 19. The components 14, 17, 18, 19, 20, 21 and 22 are secured to the engine's rear housing 23 whose material is cast iron and it is preferred that their fastening be accomplished without bolting to the adjoining rotor housing 24 shown in FIG. 3 whose material is an aluminum alloy. This can readily be accomplished with conventional means except for the distributor 21 and oil separator 22.

Figure 2:
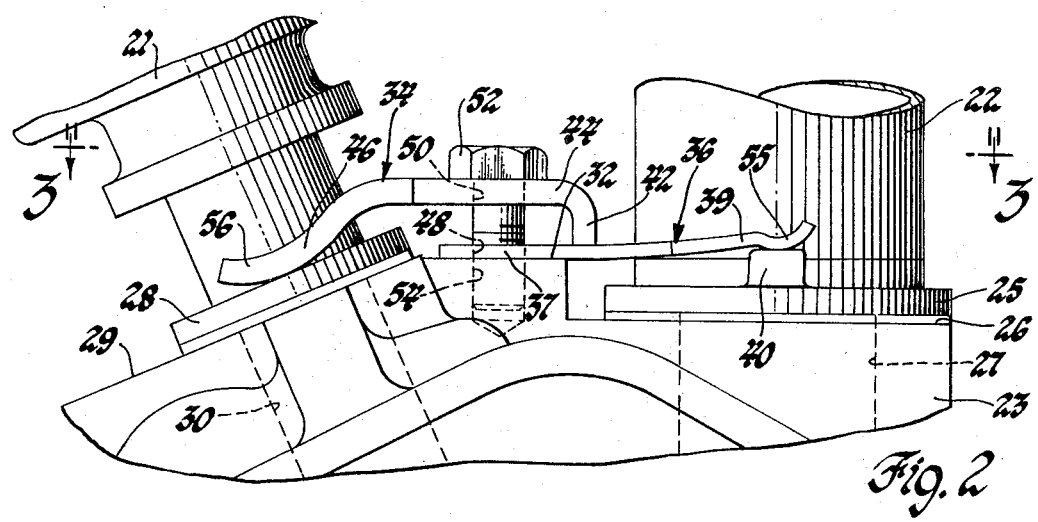
FIG. 2 is an enlarged view of the clamp assembly shown in FIG. 1.
Figure 3:
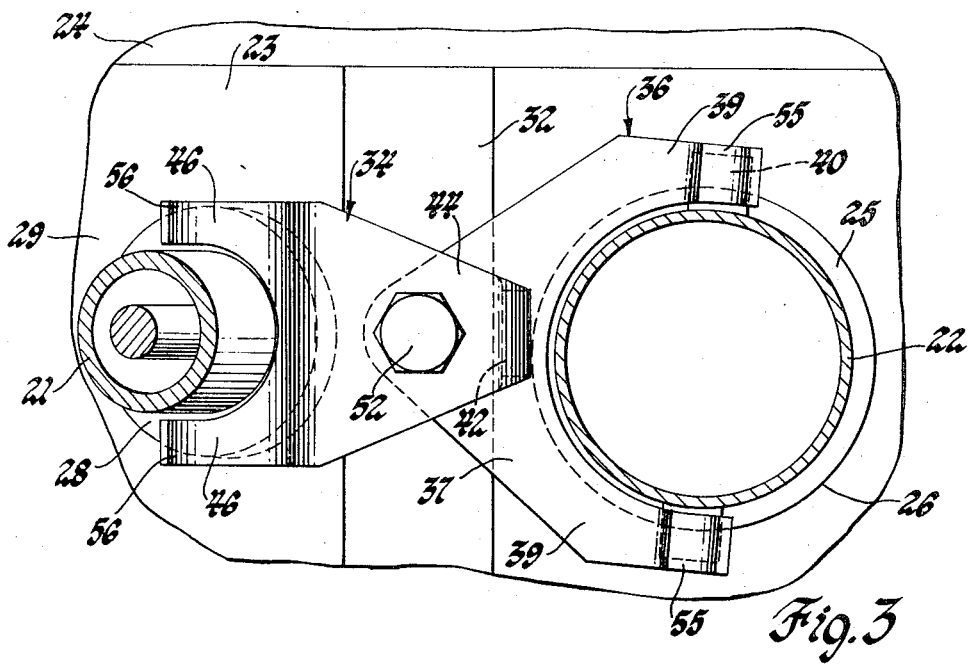
FIG. 3 is a view taken along the line 3—3 in FIG. 2.

As best shown in FIGS. 2 and 3, the oil separator 22 which is part of the engine's vent system and also serves as an oil filler tube is arranged vertically on the rear housing 23 with a cylindrical flange 25 resting on a flat mounting pad 26 formed on the rear housing and is received in and located by an aperture 27 through the pad 26. The distributor 21 is arranged at an angle of about 25° from a vertical line with a cylindrical flange 28 resting on a flat mounting pad 29 formed on the rear housing 23 and is received in and located by an aperture 30 through the pad 29. The oil separator 22 requires a clamping force such as 100 pounds for proper clamping to its mounting pad 26 while the distributor 21 requires a much higher clamping force such as 800 pounds for proper clamping to its mounting pad 29. Because of the many engine components and the accompanying pipes and linkages and supporting brackets, all of which are not shown, that secure to the engine, there is very little space in which separate clamps and fasteners may be suitably located and secured to properly clamp or aid in clamping the distributor and oil separator. In the particular arrangement there is a small space left on the rear housing 23 between the distributor 21 and the oil separator 22 and it will now be shown how it is possible to employ the clamp assembly according to the present invention in this small space to clamp both the distributor and oil separator with a single fastener and with the proper clamping forces.

As shown in FIGS. 2 and 3, a single flat clamp mounting pad 32 is machined on rear housing 23 intermediate the oil separator mounting pad 26 and the distributor mounting pad 29. As best shown in FIG. 2, the clamp mounting pad 32 is parallel to and higher than the oil separator mounting pad 26 and joins with the distributor mounting pad 29 which is thus angled thereto. The clamp assembly comprises a pair of fork-shaped clamp members 34 and 36 of stamped steel each having a pair of arms extending in the same general direction and a leg extending in the opposite general direction. The space between the legs of each clamp is semicircular and is sized to receive the component to be clamped where such component has a cylindrical shape like the distributor and oil separator while the leg has a generally equilateral triangular shape with its apex forming the leg end.

The clamp member 36 is arranged to have its leg 37 rest on the clamp mounting pad 32 while its arms 39 reach around the oil separator to engage clamping bosses 40 formed thereon at diametrically opposite locations radially outward of this component's mounting aperture 27 with such engagement elevated above the clamp mounting pad 32 so that when a downward force is applied to a midportion of the clamp member 36 as described in more detail later, the arms 39 press the oil separator's base 25 down against the mounting pad 26. The other clamp member 34 has a foot 42 extending downward at right angles from the end of its leg 44 while the arms 46 are also bent downward from the plane of the leg 44. The clamp member 34 is arranged to have its leg 44 overlap and its foot 42 engage the leg 37 of the other clamp member 36 while its arms 46 engage the distributor's base 28 at diametrically opposite locations radially outward of this component's mounting aperture 30 so that on application of a downward force to the leg 44 the arms 46 press the distributor's base 28 against its mounting pad 29 while the foot 42 engages the other clamp member 36 to press its leg 37 against the clamp mounting pad 32 and force the arms 39 to press downward on the oil separator's clamping pads 40.

The legs 37 and 44 of the clamp members have apertures 48 and 50 that are aligned and are located over the clamp mounting pad 32 and a fastener in the form of a bolt 52 extends through these openings and engages a threaded hole 54 in the clamp mounting pad 32. The bend in the arms 46 of the clamp member 34 is sized in relation to the height of the foot 42 so that the leg 44 is parallel or substantially parallel to the clamp mounting pad to provide flat engagement with the underside of the head of bolt 52 as shown. The bolt 52 thus fastens the clamp members 34 and 36 to the rear housing 23 and on torquing thereof the head applies a downward force on the leg 44 of the clamp member 34. With this arrangement the clamp member 36 can be made substantially thinner than the other clamp member 34 with the result that relative to each other the latter clamp member is stiffer or rigid between its load locations and the former member is flexible between the clamp mounting pad 32 and its arm load locations but is less flexible between the pad 32 and its load location at the foot 42. With such differences in beam strength and the bolt applied force, the arms 46 of clamp member 34 clamp the distributor 21 to its mounting pad 29 without substantial bending while the foot 42 acts on the leg 37 of the clamp member 36 which does flex or bend substantially with the leg 37 thereof forced flat against the clamp mounting pad 32 while the arms 39 bend and clamp the oil separator 22 to its mounting pad 26.

To ensure that the clamping forces are applied perpendicular or substantially perpendicular to the component mounting pads, the respective arms 39 and 46 of the clamp members are provided with spherical sections 55 and 56 where they engage the components they clamp so that the proper force direction is maintained independent of the angularity of the arms. With the relative fulcruming of the different clamp members 34 and 36 and application of the clamping force by the single bolt 52 to the stiff clamp member 34 between its longitudinally spaced load locations, there is thus effected the proper high clamping force clamping the distributor 21 in place and the proper low clamping force clamping the oil separator 22 in place with the difference in these high and low clamping forces decreasing as the distance between the foot 42 and the bolt 52 is increased.

Figure 4:
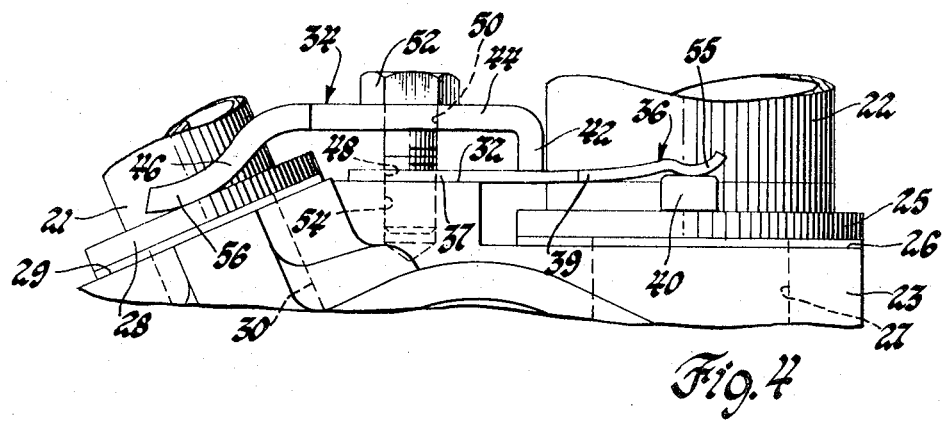
FIG. 4 is a view similar to FIG. 2 showing a modification of the clamp assembly.

For example, when as is illustrated in FIG. 4 the length of the leg 44 of the stiff clamp member 34 is increased to move the foot 42 further rightward from the clamp mounting pad, there will be applied less clamping force to the distributor 21 and proportionately more clamping force to the oil separator 22.

Figure 5:
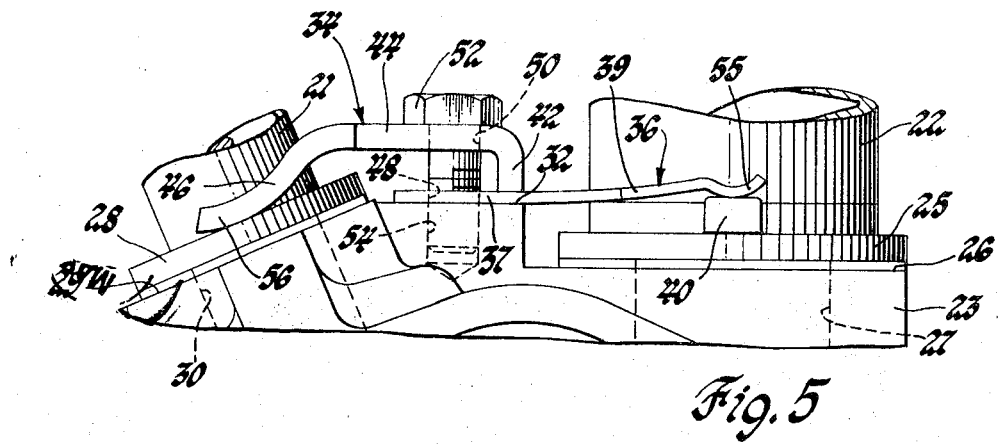
FIG. 5 is a view similar to FIG. 2 showing another modification of the clamp assembly.

It is also possible with the clamp assembly according to the present invention to limit the low clamping force to a predetermined value while continuing to increase the high clamping force. This is accomplished as shown in FIG. 5 by shortening the leg 44 of the stiff clamp member 34 so that the foot 42 engages the leg 37 of the flexible clamp member 36 opposite the clamp mounting pad 32 so that on tightening the bolt 52 the foot 42 after having forced leg 37 flat against pad 32 thereafter obtains all its reaction from this pad. Thus, the bolt 52 can thereafter be further torqued to increase the clamping load applied by the stiff clamp member 34 without increasing the clamping force applied by the flexible clamp member 36 since the load applied by the latter clamp member has now been limited by the spring rate of its arm 39.

Thus, the clamp assembly according to the present invention is operable to retain two different components with different clamping requirements utilizing two clamp members and a common or single fastener and thus produces a cost savings in fasteners and a reduction in the attaching space required. In addition, the low load clamp member can be made of thinner and lower cost material than the high load clamp member. Furthermore, the geometry of the clamping arrangement can be readily altered to vary the different clamping loads to meet different requirements.

The above described embodiment is illustrative of the invention which may be modified within the scope of the appended claims.

I claim:

1. A clamp assembly comprising a housing having a pair of component mounting pads and a clamp mounting pad therebetween, first and second components requiring low and high clamping forces respectively against the respective component mounting pads, a pair of clamp members, one of said clamp members being flexible and arranged to rest on said clamp mounting pad while engaging said first component to press said first component against this component's mounting pad, the other of said clamp members being stiff and having a foot extending transverse therefrom arranged to engage said one clamp member, said other clamp member also arranged to engage said second component to press said second component against this component's mounting pad while said foot engages and presses said one clamp member against said clamp mounting pad and also against said first component, said clamp members having apertures that are aligned and are located intermediate said foot of said other clamp member and where said other clamp member engages said second component, and a single fastener extending through said apertures and secured to said clamp mounting pad for fastening both said clamp members to said clamp mounting pad while also applying force on said other clamp member at a location intermediate said foot and the engagement of said other clamp member with said second component so that said other clamp members clamps said second component to this component's mounting pad with a high clamping force while said foot acts on said one clamp member so that said one clamp member flexes and clamps said first component to this component's mounting pad with a low clamping force with the difference in said high and low clamping forces decreasing as the distance between said foot and said fastener is increased.

2. A clamp assembly comprising a housing having a pair of component mounting pads each with an aperture and also having a clamp mounting pad therebetween, first and second components each received in one of said apertures and requiring low and high clamping forces respectively against the respective component mounting pads, a pair of fork-shaped clamp members each having a pair of arms extending in the same general direction and a leg extending in the opposite general direction, one of said clamp members being flexible and arranged to have its leg rest on said clamp mounting pad while its arms engage said first component on opposite sides of this component's accommodating aperture to press said first component against this component's mounting pad, the other of said clamp members being stiff and having a foot extending transverse to and from the end of the leg thereof, said other clamp member arranged to have its leg overlap and its foot engage the leg of said one clamp member and have its arms engage said second component on opposite sides of this component's accommodating aperture to press said second component against this component's mounting pad while said foot engages said one clamp member to press the leg thereof against said clamp mounting pad and force said one clamp member to press the arms thereof against said first component, said legs having apertures that are aligned and are located intermediate said foot and the arms of said other clamp member, and a single fastener extending through said apertures in said legs and secured to said clamp mounting pad for fastening both said clamp members to said clamp mounting pad while also applying force on the leg of said other clamp member so that the arms thereof clamp said second component to this component's mounting pad with a high clamping force while said foot acts on the leg of said one clamp member so that said one clamp member flexes and the arms thereof clamp said first component to this component's mounting pad with a low clamping force with the difference in said high and low clamping forces decreasing as the distance between said foot and said fastener is increased.

3. A clamp assembly comprising a housing having a pair of component mounting pads each with an aperture and also having a clamp mounting pad therebetween, first and second components each received in one of said apertures and requiring low and high clamping forces respectively against the respective component mounting pads, a pair of fork-shaped clamp members each having a pair of arms extending in the same general direction and a leg extending in the opposite general direction, one of said clamp members being flat and flexible and arranged to have its leg rest flat on said clamp mounting pad while its arms engage said first component at a height above said clamp mounting pad on opposite sides of this component's accommodating aperture and flex to press said first component against this component's mounting pad, the other of said clamp members being stiff and having a foot extending transverse to and from the end of the leg thereof, said other clamp member arranged to have its leg overlap and its foot engage the leg of said one clamp member opposite said clamp mounting pad and have its arms engage said second component on opposite sides of this component's accommodating aperture to press said second component against this component's mounting pad while said foot engages said one clamp member to press the leg thereof against said clamp mounting pad and forces said one clamp member to press the arms thereof against said first component, said legs having apertures that are aligned and are located intermediate said foot and the arms of said other clamp member, and a single fastener extending through said apertures in said legs and secured to said clamp mounting pad for fastening both said clamp members to said clamp mounting pad while also applying force on the leg of said other clamp member so that the arms thereof clamp said second component to this component's mounting pad with a high clamping force while said foot acts to press the leg of said one clamp member flat against said clamp mounting pad while flexing the arms thereof to clamp said first component to this component's mounting pad with a low clamping force that is dependent on the spring rate of the arms of said one clamp member.

4. A clamp assembly comprising a housing having a pair of component mounting pads each with an aperture and also having a clamp mounting pad therebetween, first and second components each received in one of said apertures and requiring low and high clamping forces respectively against the respective component mounting pads, a pair of fork-shaped clamp members each having a pair of arms extending in the same general direction and a leg extending in the opposite general direction, one of said clamp members being flat and flexible and arranged to have its leg rest flat on said clamp mounting pad while its arms engage said first component at a height above said clamp mounting pad on opposite sides of this component's accommodating aperture and flex to press said first component against this component's mounting pad, the other of said clamp members being stiff and having a foot extending transverse to and from the end of the leg thereof, said other clamp member arranged to have its leg overlap and its foot engage the leg of said one clamp member between said clamp mounting pad and the engagement of said one clamp member with said first component and have its arms engage said second component on opposite sides of this component's accommodating aperture to press said second component against this component's mounting pad while said foot engages said one clamp member to press the leg thereof against said clamp mounting pad and forces said one clamp member to press the arms thereof against said first component, said legs having apertures that are aligned and are located intermediate said foot and the arms of said other clamp member, and a single fastener extending through said apertures in said legs and secured to said clamp mounting pad for fastening both said clamp members to said clamp mounting pad while also applying force on the leg of said other clamp member so that the arms thereof clamp said second component to this component's mounting pad with a high clamping force while said foot acts on the leg of said one clamp member so that said one clamp member flexes and the arms thereof clamp said first component to this component's mounting pad with a low clamping force with the difference in said high and low clamping forces decreasing as the distance between said foot and said fastener is increased.

5. A clamp assembly comprising a housing having a pair of angled component mounting pads each with an aperture and also having a clamp mounting pad therebetween parallel to one of said component mounting pads, first and second components received in said apertures and requiring low and high clamping forces respectively against the respective component mounting pads, siad first component received against said one component mounting pad, a pair of fork-shaped clamp members each having a pair of arms extending in the same general direction and a leg extending in the opposite general direction, one of said clamp members being flat and flexible and arranged to have its leg rest flat on said clamp mounting pad while its arms engage said first component at a height above said clamp mounting pad on opposite sides of this component's accommodating aperture and flex to press said first component against said one component mounting pad, the other of said clamp members being stiff and having a foot extending transverse to and from the end of the leg thereof, said other clamp member arranged to have its leg overlap and its foot engage the leg of said one clamp member between said clamp mounting pad and the engagement of said one clamp member with said first component and have its arms engage said second component on opposite sides of this component's accommodating aperture to press said second component against the other component mounting pad while said foot engages said one clamp member to press the leg thereof against said clamp mounting pad and flexes said one clamp member to press the arms thereof against said first component, said legs having apertures that are aligned and are located intermediate said foot of said other clamping member and said second component, and a single fastener extending through said apertures in said legs and secured to said clamp mounting pad for fastening both said clamp members to said clamp mounting pad while also applying force on the leg of said other clamp member at a location intermediate said foot and the engagement of said other clamp member with said second component so that the arms thereof clamp said second component to said other component mounting pad with a high clamping force while said foot acts on the leg of said one clamp member so that said one clamp member flexes and the arms thereof clamp said first component to said one component mounting pad with a low clamping force with the difference in said high and low clamping forces decreasing as the distance between said foot and said fastener increases.

* * * * *